(12) United States Patent
Hamada et al.

(10) Patent No.: US 6,561,543 B1
(45) Date of Patent: May 13, 2003

(54) VEHICULAR CHILD SEAT DETECTION SYSTEM

(75) Inventors: Makoto Hamada, Toyota (JP); Osamu Fujimoto, Nisshin (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/220,803

(22) Filed: Dec. 28, 1998

(30) Foreign Application Priority Data

Jan. 9, 1998 (JP) .......................................... 10-003098

(51) Int. Cl.[7] .............................................. B60R 21/32
(52) U.S. Cl. .......................... 280/735; 280/734; 701/45
(58) Field of Search ................. 280/735, 734; 701/45

(56) References Cited

U.S. PATENT DOCUMENTS

| | | | | |
|---|---|---|---|---|
| 5,468,014 A | * | 11/1995 | Gimbel et al. ............... | 280/735 |
| 5,515,933 A | * | 5/1996 | Meyer et al. ............... | 180/273 |
| 5,618,056 A | * | 4/1997 | Schoos et al. ............... | 280/735 |
| 5,636,864 A | | 6/1997 | Hori | |
| 5,683,103 A | | 11/1997 | Blackburn et al. | |
| 5,690,356 A | * | 11/1997 | Lane, Jr. ...................... | 280/735 |
| 5,720,519 A | * | 2/1998 | Barnes .................. | 297/216.11 |
| 5,831,342 A | * | 11/1998 | Vivacqua et al. .......... | 307/10.1 |
| 5,882,035 A | * | 3/1999 | Munro ........................ | 280/735 |
| 5,893,582 A | * | 4/1999 | Allen et al. ................. | 280/735 |
| 5,954,360 A | * | 9/1999 | Griggs, III et al. ......... | 280/735 |
| 5,992,879 A | * | 11/1999 | Bogge ........................ | 280/735 |
| 6,007,093 A | * | 12/1999 | Bechtle et al. ............... | 280/735 |
| 6,024,378 A | * | 2/2000 | Fu .............................. | 280/735 |
| 6,264,236 B1 | * | 7/2001 | Aoki ........................... | 280/735 |
| 6,371,516 B1 | * | 4/2002 | Miyagawa .................. | 280/735 |

FOREIGN PATENT DOCUMENTS

| | | |
|---|---|---|
| EP | 0 603 733 A1 | 6/1994 |
| EP | 0 646 491 A1 | 4/1995 |
| FR | 2 750 094 | 12/1997 |
| JP | 1-98048 U | 6/1989 |
| JP | 6-344817 | 12/1994 |
| JP | 8-48177 | 2/1996 |
| JP | 8-207630 | 8/1996 |
| JP | 9-156461 | 6/1997 |
| JP | 9-156462 | 6/1997 |
| JP | 9-220999 | 8/1997 |
| JP | 9-240336 | 9/1997 |

* cited by examiner

Primary Examiner—Lesley D. Morris
Assistant Examiner—J. Allen Shriver
(74) Attorney, Agent, or Firm—Oliff & Berridge, PLC

(57) ABSTRACT

A child seat (CRS) laid on a seat cushion of a front passenger seat is provided with a pair of left and right fixture attachments, which are spaced apart from each other by a predetermined distance in the direction of the width of the child seat. The fixture attachments extend rearwards from the child seat. Each of these fixture attachments is provided with a lock bar, which can be detachably coupled to a fixture bar hanging across rear portions of left and right seat cushion frames. Furthermore, there is provided a child seat detector that detects whether or not the child seat has been mounted based on movements of the lock bars resulting from coupling of the fixture attachments to the fixture bar.

16 Claims, 15 Drawing Sheets

A

B

VEHICULAR CHILD SEAT DETECTION SYSTEM

BACKGROUND OF THE INVENTION

1. Field of the Invention

The present invention relates to a vehicular child seat detection system and, more specifically, relates to a vehicular child seat detection system for detecting whether or not a child seat has been laid on a front passenger seat.

2. Description of the Related Art

Conventionally, there is provided a vehicular child seat detection system for detecting whether or not a child seat has been laid on a front passenger seat. U.S. Pat. No. 5,690,356 discloses one such example.

As shown in FIGS. 14 and 15, a child seat 100 disclosed in this U.S. Patent has a seat bottom 102 that is fixed to frames 104, 106 for securing the seat bottom 102 to a vehicular seat. On the other hand, anchors 110, 120 and 130 are fixed to a frame member of a front passenger seat 150 of the vehicle. Lock clamps 112 and 114 are provided at respective ends of the frame 104, while lock clamps 116 and 118 are provided at respective ends of the frame 106. These lock clamps 112, 114, 116 and 118 allow the child seat 100 to be fastened to or released from the anchors of the vehicular seat. As shown in FIG. 15, the lock clamp 114, which receives the anchor 110, is composed of a movable bar 160, a top bar 162 and a spring 164. The movable bar 160 has a curved portion for locking engagement. The top bar 162 is formed at the end of the frame 104, and the movable bar 160 is rotatably fixed to the top bar 162 via a pivot shaft 168. The spring 164 urges pivotal rotation of the movable bar 160. In fastening the child seat 100 to the front passenger seat 150, the movable bar 160 is caused to rotate so as to receive the anchor 110 in the curved portion. In this manner, the child seat 100 is fastened to the front passenger seat 150.

On the other hand, an electrical switch 180 is provided contiguous to one of the anchors 110. As shown in FIG. 15, when the child seat 100 has been set properly with respect to the front passenger seat 150, the leading end of the top bar 162 presses a plunger 182 of the switch 180, which then outputs an ON-signal. In this manner, it is detected whether or not the child seat 100 is located suitably. Based on the detection result, other vehicular functional elements including a passenger restraint system such as an air bag device are controlled.

It is true that the vehicular child seat detection system of this type can detect whether or not the child seat 100 is located suitably. However, this system is incapable of detecting whether or not the lock clamps 112, 114, 116 and 118 of the child seat 100 have been securely fastened to the anchors 110, 120 and 130 of the vehicular seat. For example, a slight discrepancy in location between one of the lock clamps of the child seat and a corresponding one of the anchors of the vehicular seat may hinder secure attachment of the child seat to the vehicular seat. Such inconvenience may also be caused if the movable bar of the lock clamp does not move smoothly. The aforementioned system, which merely detects whether or not the child seat has been set in proper location, cannot detect whether or not the locking mechanism of the child seat has been securely fastened to the vehicular seat.

SUMMARY OF THE INVENTION

In view of the above-described background, the present invention aims at providing a vehicular child seat detection system capable of detecting whether or not the child seat has been securely mounted to the vehicular seat.

According to a first aspect of the present invention, there is provided a vehicular child seat detection system that includes a fixture bar and child seat detection means. Fixture attachments, which are integrally attached to a vehicular seat, are detachably coupled to the fixture bar. The fixture attachments extend from a child seat in a fore-to-aft direction thereof and are spaced apart from each other by a predetermined distance in the direction of the width of the child seat. The fixture attachments are provided with latches allowing the child seat to be fastened to or released from a vehicular seat. The child seat detection means detects whether or not the child seat has been mounted, based on movements of at least one of the latches resulting from coupling of the fixture attachments to the fixture bar.

Accordingly, in mounting the child seat to the vehicular seat, the child seat detection means detects, based on movements of at least one of the latches resulting from coupling of the fixture attachments to the fixture bar, whether or not the child seat has been securely fastened to the vehicular seat. Therefore, it is possible to determine whether or not the child seat has been firmly mounted to the vehicle.

In the first aspect of the present invention, the fixture attachments may be provided with groove portions in which the fixture bar is accommodated when the fixture attachments are coupled to the fixture bar. In this case, in coupling the child seat to the vehicular seat, the latches reduce an opening width of the groove portions so as to prevent the fixture bar from falling off the groove portions.

Furthermore, in the first aspect of the present invention, the fixture bar may hang across left and right seat frames of the vehicular seat.

The vehicular child seat detection system of the first aspect may be modified according to a second aspect of the present invention. In this case, the child seat detection means is composed of a rod and a switch. The rod is parallel to the fixture bar and longer than the distance between the fixture attachments. The switch is disposed substantially at a central portion of the rod and activated when a distance between the fixture bar and the rod becomes equal to or greater than a predetermined value due to the latches.

Accordingly, in mounting the child seat to the vehicular seat, if the fixture attachments for the child seat are coupled to the fixture bar hanging across the seat frames of the vehicular seat, the latches of the fixture attachments become sandwiched between the fixture bar and the rod and thus enlarge a space therebetween. Consequently, when the distance between the fixture bar and the rod becomes equal to or greater than the predetermined value, the switch is activated to detect whether or not the child seat has been mounted properly. Thus, with a simple structure, it is possible to detect whether or not the child seat has been mounted properly. Furthermore, the switch can be designed to be activated when the distance between the fixture bar and the rod reaches a value in the case where both the left and right fixture attachments engage the fixture bar. In this case, the use of one switch is sufficient to detect whether or not the child seat has been mounted properly.

The vehicular child seat detection system of the first aspect may be modified according to a third aspect of the present invention. In this case, the child seat detection means is set opposed to at least one of the left and right fixture attachments for the child seat. The child seat detection means is composed of a base body, moving means and a switch. The base body is attached to the fixture bar. The moving means is accommodated in the base body, pressed toward the fixture bar by urging means, and caused to move away from the fixture bar by at least one of the latches. The switch is activated due to a movement of the moving means.

Accordingly, in mounting the child seat to the vehicular seat, if the fixture attachments for the child seat are coupled to the fixture bar, the moving means, which is pressed towards the fixture bar, is caused to move away from the fixture bar by at least one of the latches of the fixture attachments. In response to this movement of the moving means, the switch is activated to detect whether or not the child seat has been mounted properly. Thus, with a simple structure, it is possible to detect whether or not the child seat has been mounted securely.

In the third aspect of the present invention, the moving means may be composed of a slider movably accommodated in the base body attached to the fixture bar. The slider may have an inclined plane for engagement with at least one of the latches.

The vehicular child seat detection system of the first aspect may be modified according to a fourth aspect of the present invention. In this case, the fixture bar hangs across left and right seat frames of the vehicular seat. The child seat detection means is composed of a rod, coupling means and strain measurement means. The rod is disposed parallel to the fixture bar and passes through engaging portions of the fixture attachments. The coupling means couples the rod to the fixture bar. The strain measurement means is attached to the rod.

Accordingly, in mounting the child seat to the vehicular seat, if the fixture attachments for the child seat are coupled to the fixture bar, the rod is strained. By measuring the amount of strain imposed on the rod by means of the strain measurement means, it is detected whether or not the child seat has been mounted properly. Thus, with a simple structure, it is possible to detect whether or not the child seat has been mounted securely.

The vehicular child seat detection system of the first aspect may be modified according to a fifth aspect of the present invention. In this case, the child seat detection means is set opposed to at least one of the left and right fixture attachments for the child seat. The child seat detection means is composed of a striker, moving means and a switch. The striker is attached to the fixture bar. The moving means is pressed toward the striker by urging means and caused to move away from the fixture bar by at least one of the latches. The switch is activated due to a movement of the moving means.

Accordingly, in mounting the child seat to the vehicular seat, if the fixture attachments for the child seat are coupled to the fixture bar, the moving means, which is pressed toward the striker by the urging means, is caused to move away from the fixture bar by at least one of the latches of the fixture attachments. In response to this movement of the moving means, the switch is activated to detect whether or not the child seat has been mounted properly. Thus, with a simple structure, it is possible to detect whether or not the child seat has been mounted securely. In addition, since the fixture attachments for the child seat are designed to be attached to the striker, the overall dimension of the system can be reduced.

In the fifth aspect of the present invention, the moving means may be composed of a slider movably accommodated in the base body attached to the striker. The slider may have an inclined plane for engagement with at least one of the latches.

Furthermore, the vehicular child seat detection system according to the first through fifth aspects of the present invention may also include an indicator indicating, based on a result detected by the child seat detection means, whether or not the child seat has been mounted.

According to this construction, in mounting the child seat to the vehicle, a passenger or an operator can confirm whether or not the child seat has been mounted securely, based on what is indicated by the indicator.

Furthermore, the indicator may be divided into a plurality of display portions, the child seat detection means may detect a plurality of mounting states of the child seat, based on movements of at least one of the latches, and content to be displayed on the display portions are changed in accordance with the plurality of mounting states.

Furthermore, the vehicular child seat detection system according to the first through fifth aspects of the present invention may also include air bag control means for controlling deployment of an air bag depending on whether or not the child seat has been mounted, based on a result detected by the child seat detection means.

Thus, the use of one switch makes it possible to perform air bag control simultaneously with detection of the child seat, depending on whether or not the child seat has been mounted. Therefore, the overall structure of the system can be simplified.

DETAILED DESCRIPTION OF THE PREFERRED EMBODIMENTS

Figure 1:
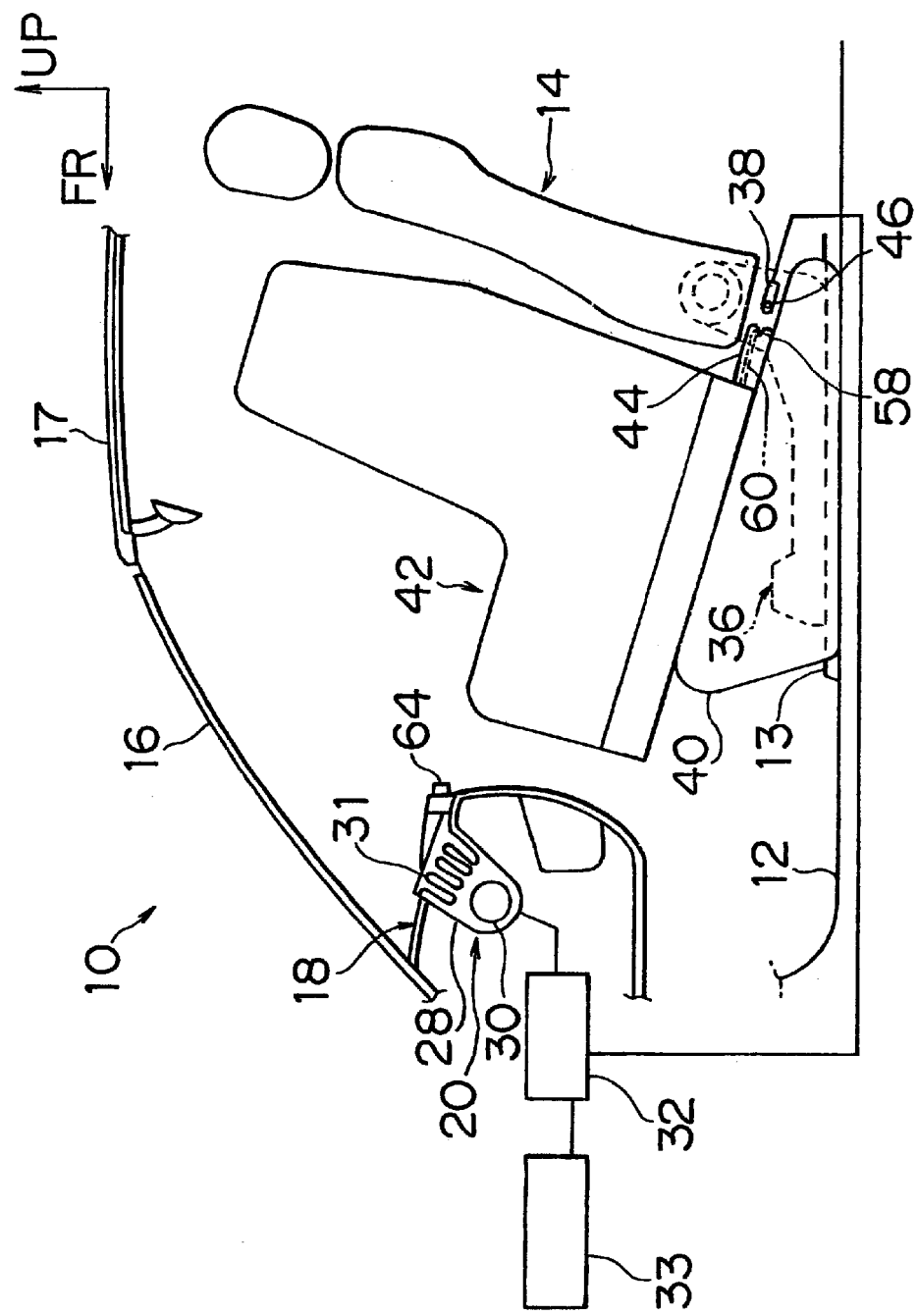
FIG. 1 is a schematic cross-sectional view of a vehicular child seat detection system according to a first embodiment of the present invention.

A vehicular child seat detection system according to a first embodiment of the present invention will now be described with reference to FIGS. 1 through 6.

It is to be noted that arrows FR and UP in the drawings respectively stand for forward and upward directions with respect to a vehicle body.

Figure 2:
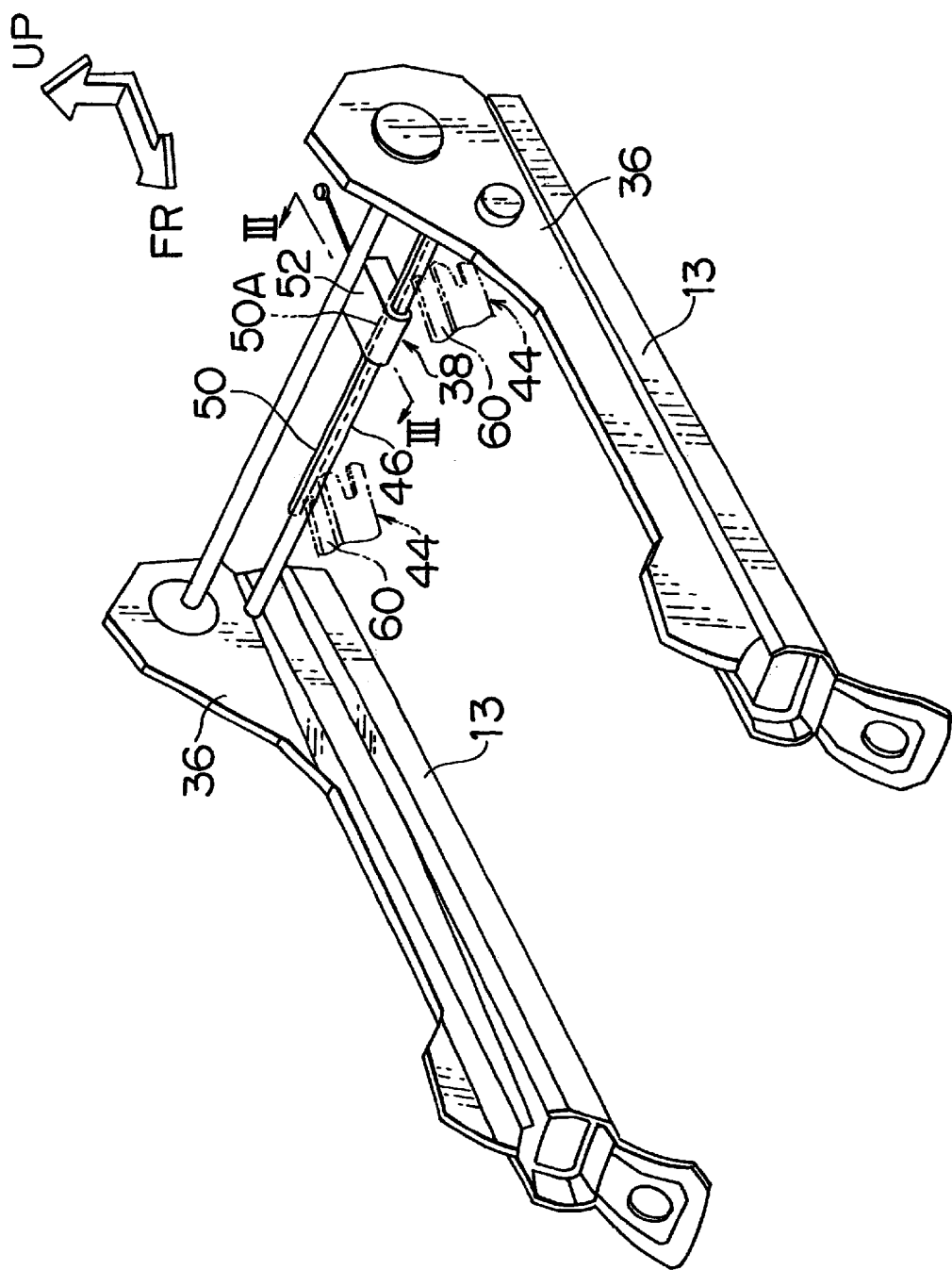
FIG. 2 is a perspective view showing mainly a seat adjuster and a fixture bar of the vehicular child seat detection system according to the first embodiment of the present invention, as viewed from a location diagonally forward of the vehicle.

As shown in FIG. 1, a front passenger seat 14, in which a passenger sits, is mounted to a floor surface 12 of a vehicle 10 via a pair of left and right seat adjusters 13 arranged parallel to each other in the fore-to-aft direction of the vehicle (See FIG. 2). Thus, the front passenger seat 14 can move relative to the floor surface 12 and reach a predetermined position in the fore-to-aft direction of the vehicle. A wind shield 16 is provided forward and upward of the front passenger seat 14. The wind shield 16 is connected at one end to a roof 17 and at the other end to a bonnet (not shown). In front of the front passenger seat 14, an instrument panel 18 is installed between the floor surface 12 and the wind shield 16. The instrument panel 18 is made of synthetic resin and has a substantially U-shaped cross-section with an opening. The instrument panel 18 is arranged such that the opening faces forwards with respect to the vehicle body.

An air bag device 20 is installed in the instrument panel 18. An air bag case 28 of the air bag device 20 has a substantially U-shaped cross-section with an opening. The air bag case 28 is arranged such that the opening faces rearwards and upwards with respect to the vehicle body. An inflator 30 is disposed at the bottom of the air bag case 28, and an air bag body 31 is accommodated in its folded state in the vicinity of the opening of the air bag case 28. Upon generation of gas by the inflator 30, the air bag body 31 is expanded and deployed from the opening of the instrument panel 18 toward the head of the adult passenger sitting in the front passenger seat 14.

The inflator 30 disposed within the air bag case 28 is connected to an air bag control circuit 32, which includes a microcomputer. The air bag control circuit 32 is connected to a collision sensor 33 for detecting deceleration of the vehicle in case of a collision.

As shown in FIG. 2, left and right seat cushion frames 36 are secured onto the left and right seat adjusters 13 respectively. A fixture bar 46 hangs across rear portions of the seat cushion frames 36. A child seat detector 38 is attached to an intermediate portion of the fixture bar 46. The child seat detector 38 is also connected to the air bag control circuit 32 (See FIG. 1).

As shown in FIG. 1, an indicator 64 is disposed on the instrument panel 18. The indicator 64 is also connected to the air bag control circuit 32.

As shown in FIG. 1, a child seat (CRS: Child Restraint System) 42 is laid on a seat cushion 40 of the front passenger seat 14. The child seat 42 is provided with a pair of left and right fixture attachments 44, which are spaced apart from each other by a predetermined distance in the direction of the width of the child seat 42. The fixture attachments 44 extend in the fore-to-aft direction of the child seat 42. Referring to FIG. 1, the fixture attachments 44 protrude rearwards (rightwards in the drawing) from the child seat 42. The child seat detector 38 is designed to detect whether or not the fixture attachments 44 of the child seat 42 have been coupled to the fixture bar 46.

As shown in FIG. 2, the child seat detector 38 is horizontally attached to the fixture bar 46 and provided with a rod 50, which is formed of a round bar longer than the distance between the left and right fixture attachments 44 shown in FIG. 1.

Figure 3:
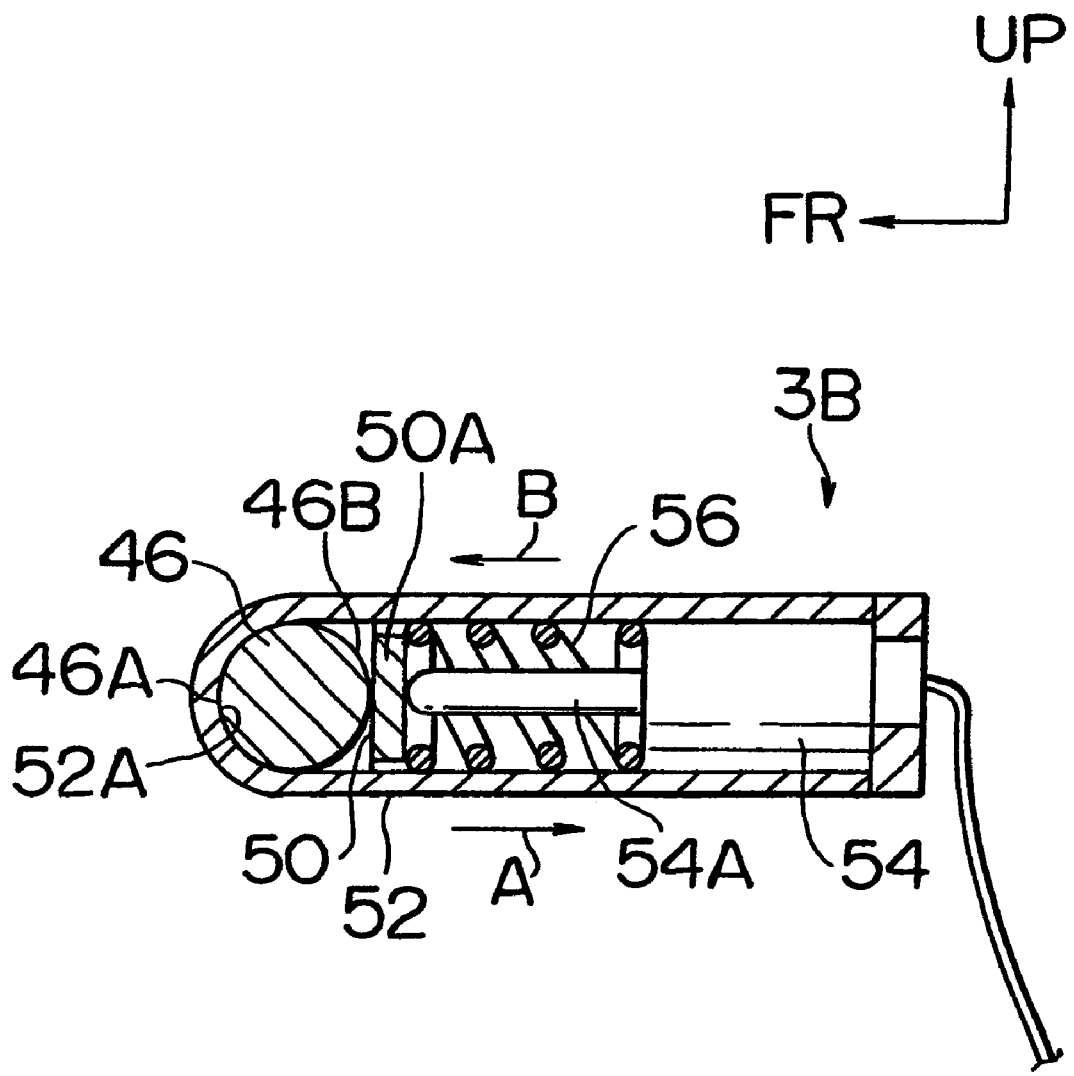
FIG. 3 is an enlarged cross-sectional view taken along line III—III in FIG. 2.

As shown in FIG. 3, the child seat detector 38 has a base body 52 of a U-shaped cross-section. A bottom portion 52A of the base body 52 is attached to a front outer circumference portion 46A of the fixture bar 46. The rod 50 extends through and is supported by the base body 52 such that the rod 50 can move both rearwards (as indicated by an arrow A in FIG. 3) and forwards (as indicated by an arrow B). An intermediate portion 50A of the rod 50 extending through the base body 52 has a rectangular cross-section. The intermediate portion of the rod 50 abuts on a rear outer circumference portion 46B.

A switch 54 is disposed in the base body 52 on the side of an opening thereof (on the rear side). The switch 54 has an actuator 54A that abuts on the intermediate portion 50A of the rod 50. A coil spring 56 serving as urging means surrounds the actuator 54A of the switch 54. The coil spring 56 is disposed between the intermediate portion 50A of the rod 50 and the switch 54, and urges the intermediate portion 50A of the rod 50 to come into abutment on the fixture bar 46 (as indicated by the arrow B in FIG. 3).

Figure 4:
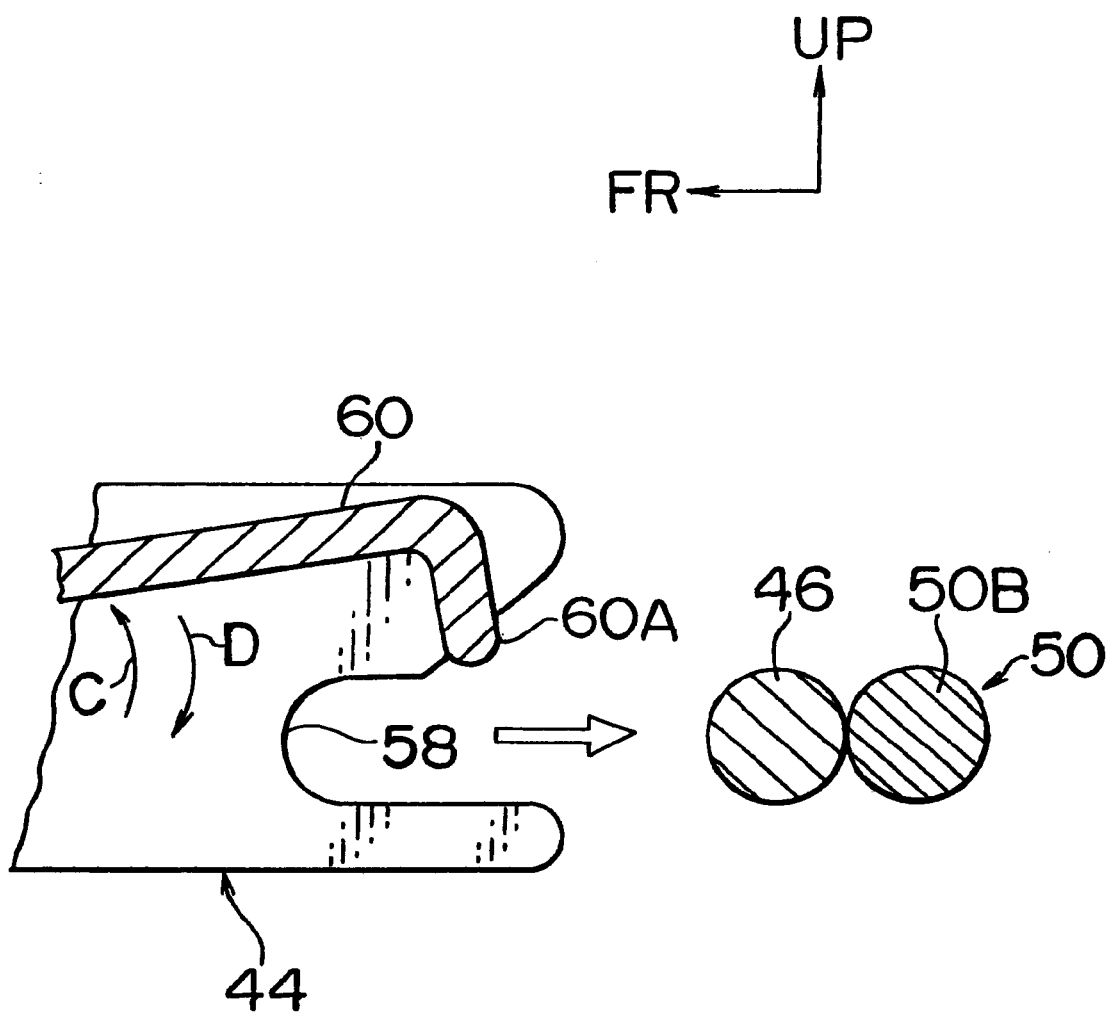
FIG. 4 is an explanatory view of the operation of the vehicular child seat detection system according to the first embodiment of the present invention, showing a state where the child seat is about to be mounted.

As shown in FIG. 4, a U-shaped notch 58 is formed in a leading end portion of each of the left and right fixture attachments 44 of the child seat 42. The notch 58 is designed to accommodate the fixture bar 46 and two lateral end portions 50B of the rod 50 of a circular cross-section. A lock bar 60 (latch) of an L-shaped cross-section is attached to the leading end portion of the fixture attachment 44. The lock bar 60 is caused to rotate vertically (as indicated by arrows C, D in FIG. 4) by operating an operational lever (not shown). Alternatively, the lock bar 60 starts its vertical rotation automatically in response to the mounting of the child seat 42 to the seat 14.

Figure 5:
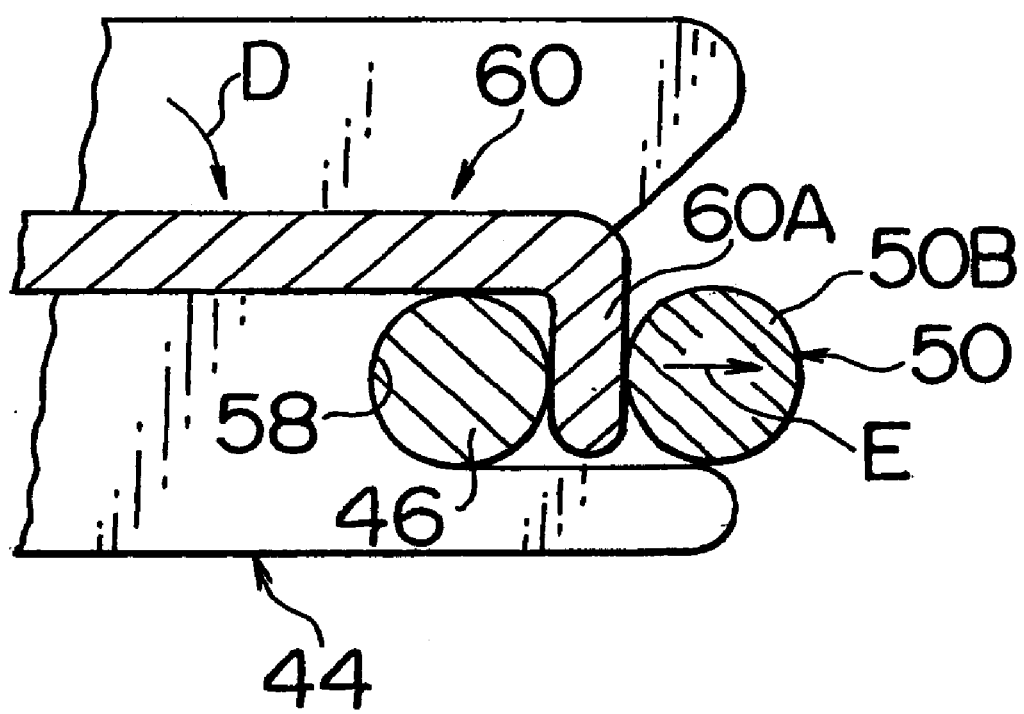
FIG. 5 is an explanatory view of the operation of the vehicular child seat detection system according to the first embodiment of the present invention, showing a state where the child seat has been mounted.

Hence, as shown in FIG. 5, if the lock bar 60 rotates downwards (as indicated by the arrow D in FIG. 5) in a state where the fixture bar 46 and the lateral end portion 50B of the rod 50 are accommodated in the notch 58 of the fixture attachment 44, a leading end portion 60A of the lock bar 60 becomes sandwiched between the fixture bar 46 and the lateral end portion 50B of the rod 50. Thereby, the rod 50 moves rearwards (as indicated by an arrow E in FIG. 5).

Figure 6:
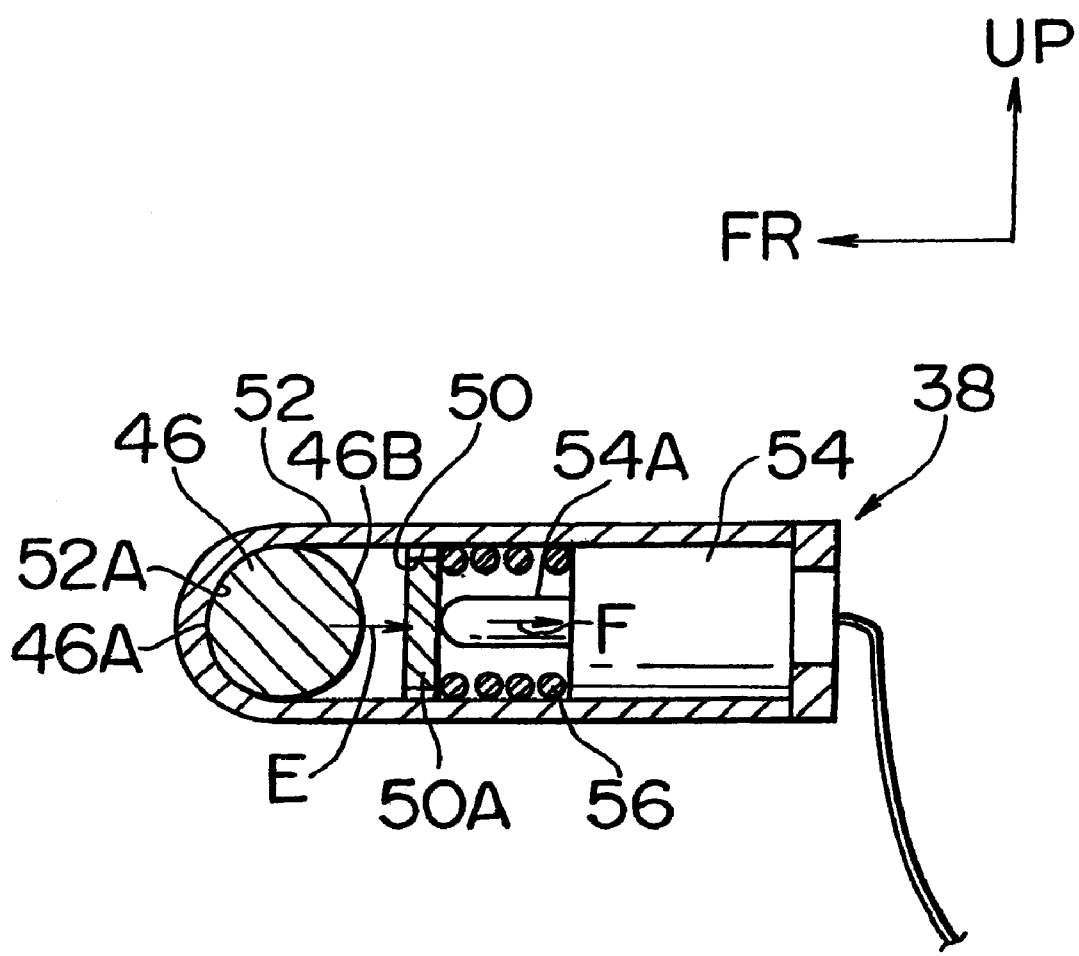
FIG. 6 is a cross-sectional view corresponding to FIG. 3, showing a state where the child seat of the vehicular child seat detection system according to the first embodiment of the present invention is mounted.

As shown in FIG. 6, if the rod 50 moves rearwards (as indicated by the arrow E in FIG. 5), the coil spring 56 disposed in the base body 52 of the child seat detector 38 is compressed, and the actuator 54A moves rearwards (as indicated by an arrow F in FIG. 6) so as to turn the switch 54 on. If the switch 54 is turned on, the air bag control circuit 32 determines that the child seat 42 has been laid on the seat cushion 40 of the front passenger seat 14, lights up the indicator 64, and deactivates the air bag device 20.

Figure 7:
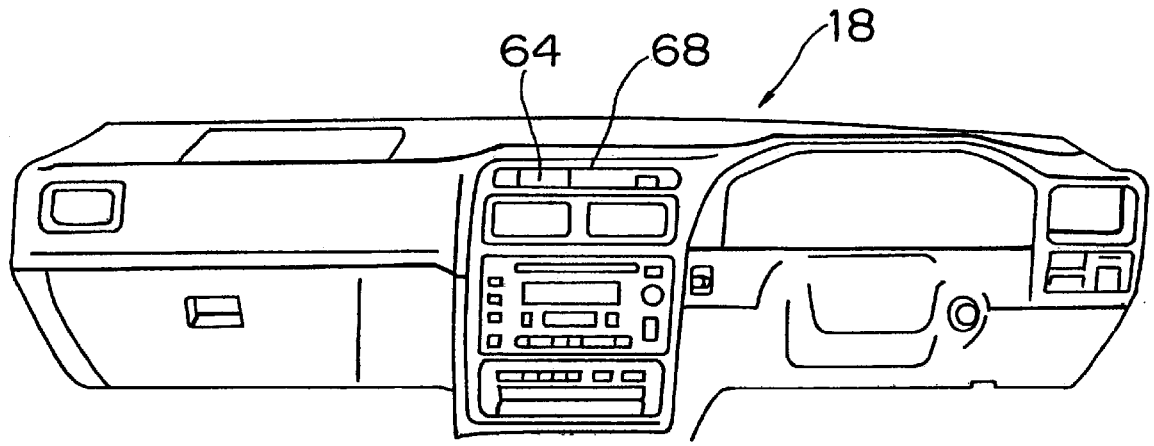
FIG. 7 shows an instrument panel according to the first embodiment of the present invention.
Figure 8:
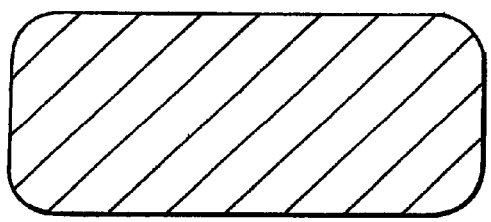
FIG. 8 shows examples indicated by an indicator of the vehicular child seat detection system according to the first embodiment of the present invention.
Figure 8:
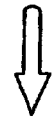
Figure 8:
Figure 8:
Figure 8:
Figure 8:

As shown in FIG. 1, the indicator 64 is disposed on the instrument panel 18. The indicator 64 is connected to the air bag control circuit 32 and informs the passenger, based on a signal from the air bag control circuit 32, whether or not the child seat 42 is mounted. If the child seat 42 is mounted, the indicator 64 warns the passenger that the air bag device 20 has been deactivated. As shown in FIG. 7, the indicator 64 is disposed in a center cluster portion 68, which is located substantially at the center in the lateral direction of the vehicle body. Therefore, the indicator 64 is easily visible from the passenger. As shown in FIG. 8A, the indicator 64 may be provided with a single display portion. Alternatively, as shown in FIG. 8B, the indicator 64 may be provided with a display portion that is divided into upper and lower portions and is capable of simultaneously indicating control states of two vehicular functions. In fact, the indicator 64 may be provided with a display portion of any type. Upon receiving ON- and OFF-signals from the switch 54, the display portion shown in FIG. 8A is lit up and put out respectively. Therefore, the passenger can confirm at a glance whether or not the child seat has been mounted properly.

The operation of this embodiment will now be described.

According to this embodiment, in setting the child seat 42 onto the seat cushion 40 of the front passenger seat 14, the lock bar 60 is caused to rotate upwards (as indicated by the arrow C in FIG. 4) by operating the operational lever (not shown). Alternatively, the lock bar 60 rotates upwards automatically in response to the mounting of the child seat 42 to the seat 14. In either case, the lock bar 60 assumes a state shown in FIG. 4. The child seat 42 is then displaced rearwards with respect to the vehicle body and along the seat cushion 40, so that the fixture bar 46 and the lateral end portion 50B of the rod 50 come into the notch 58 of the fixture attachment 44 attached to the child seat 42.

After the fixture bar 46 and the lateral end portion 50B of the rod 50 have been received in the notch 58 of the fixture attachment 44 attached to the child seat 42, the lock bar 60 rotates downwards (as indicated by the arrow D in FIG. 5), so that the leading end portion 60A of the lock bar 60 becomes sandwiched between the fixture bar 46 and the lateral end portion 50B of the rod 50. As a result, the rod 50 moves rearwards (as indicated by the arrow E in FIG. 5).

As shown in FIG. 6, if the rod 50 moves rearwards (as indicated by the arrow E in FIG. 6), the coil spring 56 disposed in the base body 52 of the child seat detector 38 is compressed, and the actuator 54A moves rearwards (as indicated by the arrow F in FIG. 6) so as to turn the switch 54 on. If the switch 54 is turned on, the air bag control circuit 32 determines that the child seat 42 has been laid on the seat cushion 40 of the front passenger seat 14, lights up the indicator 64, and deactivates the air bag device 20. The indicator 64 warns the passenger, based on a signal from the air bag control circuit 32, that the child seat 42 has been mounted and that the air bag device 20 has been deactivated.

According to the vehicular child seat detection system of this embodiment, when the leading end portion 60A of the lock bar 60 becomes capable of securely locking the child seat 42, the switch 54 is turned on. In other words, when the leading end portion 60A of the lock bar 60 becomes sandwiched between the fixture bar 46 and the lateral end portion 50B of the rod 50 to displace the rod 50 rearwards (as indicated by the arrow E in FIG. 5), the switch 54 is turned on. Therefore, it is possible to detect whether or not the child seat has been securely mounted to the vehicle.

Furthermore, according to the construction of this embodiment, both the left and right fixture attachments 44 of the child seat 42 engage the fixture bar 46, and the switch 54 is turned on when the gap between the fixture rod 46 and the lateral end portion 50A of the rod 50 exceeds a predetermined distance. Hence, in the case where the child seat 42 is not completely mounted to the seat 14, i.e., where only one of the fixture attachments 44 is in engagement with the fixture bar 46, the gap between the fixture bar 46 and the lateral end portion 50A of the rod 50 does not exceed the predetermined value and the switch 54 remains turned off. As a result, the indicator 64 does not indicate that the child seat 42 has been mounted. Accordingly, an operator is informed that the child seat 42 is incompletely mounted to the seat 14. As can be understood from the foregoing description, one piece of the switch 54 is sufficient to detect whether or not the child seat has been mounted securely.

Also, the air bag is deactivated by turning the switch 54 on. Thus, the use of one switch makes it possible to perform air bag control simultaneously with detection of the child seat, depending on whether or not the child seat has been mounted. Therefore, the overall structure of the system can be simplified.

In this embodiment, the display portion shown in FIG. 8B can be employed instead of the one shown in FIG. 8A. In a vehicle employing the display portion shown in FIG. 8B, the switch 54 is designed to be capable of outputting two different signals depending on a displacement stroke of the actuator 54A. For example, the rearward displacement stroke made by the rod 50 differs depending on whether the lock bar 60 of only one of the left and right fixture attachments 44 becomes sandwiched between the fixture bar 46 and the rod 50, or the lock bars 60 of both the left and right fixture attachments 44 become sandwiched between the fixture bar 46 and the rod 50. In outputting signals, the switch 54 must be able to distinguish between those two different states. When the switch 54 is off, both the upper and lower display portions remain unlit. Upon receiving from the switch 54 an ON-signal corresponding to a state where the lock bar 60 of only one of the left and right fixture attachments 44 has become sandwiched between the fixture bar 46 and the rod 50, the upper display portion blinks on and off. Furthermore, upon receiving from the switch 54 an ON-signal corresponding to a state where the lock bars 60 of both the left and right fixture attachments 44 have become sandwiched between the fixture bar 46 and the rod 50, both the upper and lower display portions light up. Accordingly, if the upper display portion light up, the passenger can confirm at a glance that the child seat has been mounted incompletely. If both the upper and lower display portions blink on and off, the passenger can confirm at a glance that the child seat has been mounted completely, and therefore that the air bag device has been deactivated. As described hitherto, the use of the display portion shown in FIG. 8B enables the passenger to confirm at a glance whether or not the child seat has been mounted to the vehicle securely.

A vehicular child seat detection system according to a second embodiment of the present invention will now be described with reference to FIGS. 9 through 11.

In the first and second embodiments, like components are denoted by like reference numerals. Hereinafter, those components which operate in the same manner as in the first embodiment will not be described again.

Figure 9:
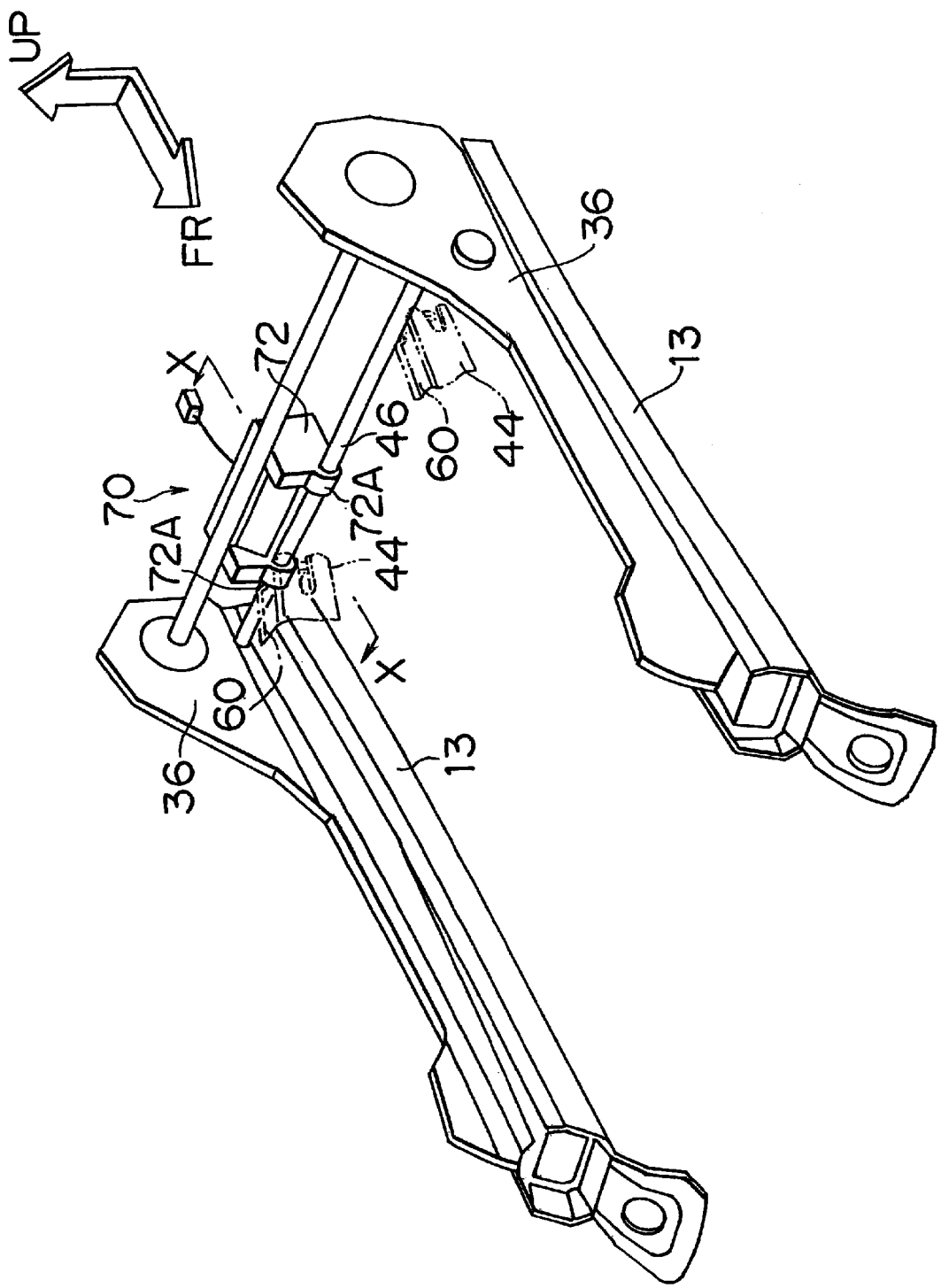
FIG. 9 is a perspective view showing mainly a seat adjuster and a fixture bar of a vehicular child seat detection system according to a second embodiment of the present invention, as viewed from a location diagonally forward of the vehicle.

As shown in FIG. 9, in this embodiment, a child seat detector 70 is disposed at a location corresponding to one of the left and right fixture attachments 44, that is, in the vicinity of one end of the fixture bar 46. The child seat detector 70 is connected to the air bag control circuit 32 (See FIG. 1).

A pair of left and right attachment portions 72A are formed at front end portions of a base body 72 of the child seat detector 70. The fixture bar 46 extends through the attachment portions 72A, which serve to attach the fixture bar 46 to the base body 72.

Figure 10:
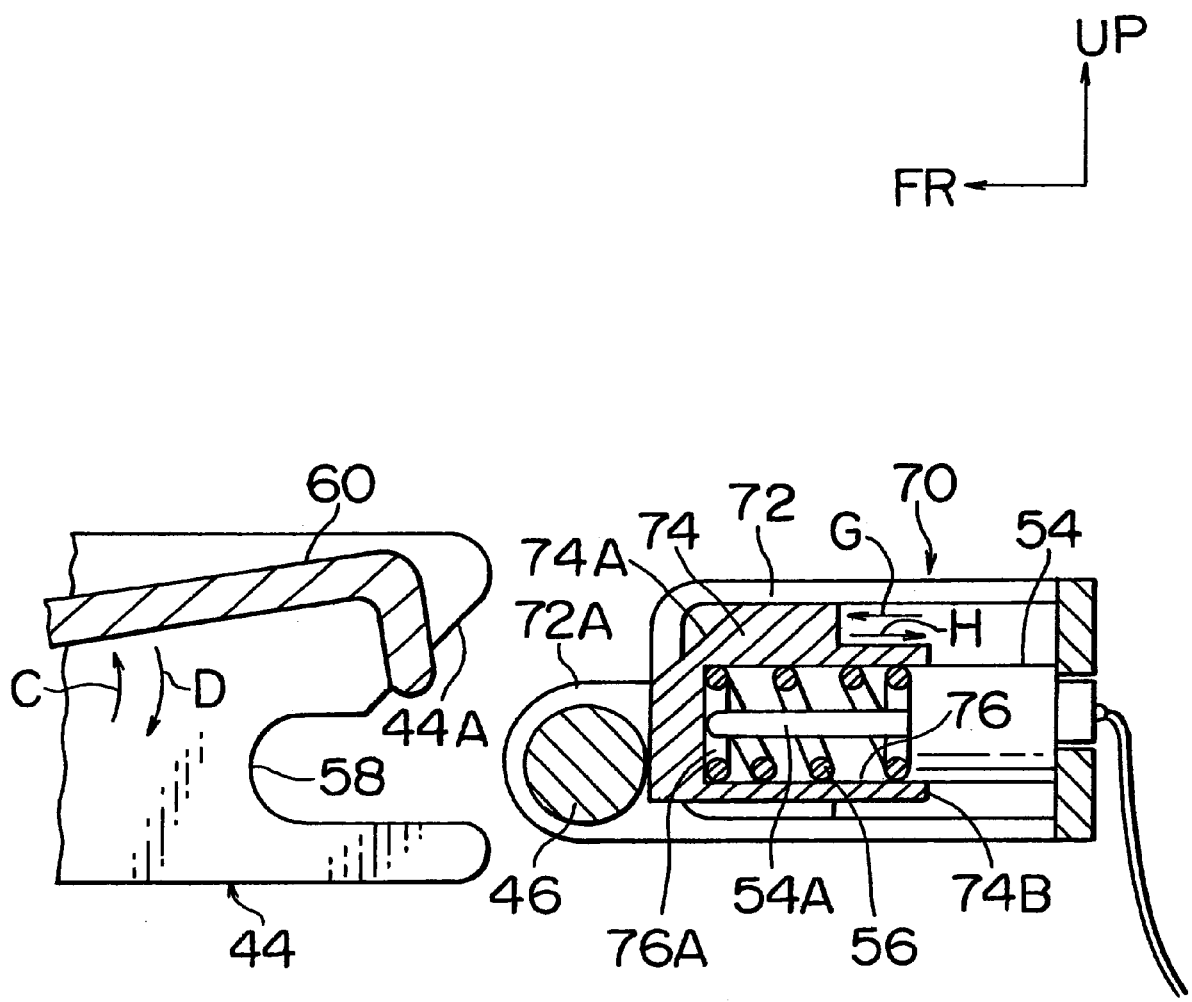
FIG. 10 is an enlarged cross-sectional view taken along line X—X in FIG. 7.

As shown in FIG. 10, the base body 72 accommodates a slider 74 as moving means, which is movable in the fore-to-aft directions (as indicated by arrows G and H in FIG. 10). A front upper end portion of the slider 74 has an inclined plane 74A, which is designed to abut on an inclined plane 44A formed at a leading upper end portion of the notch 58 of the fixture attachment 44. A recess 76 is formed in a back wall portion 74B of the slider 74 and extends forward thereof. The switch 54 is accommodated in a rear portion of the base body 72. The actuator 54A of the switch 54 is inserted into the recess 76 of the slider 74 and located contiguous to a bottom portion 76A of the recess 76. The coil spring 56 surrounds the actuator 54A of the switch 54. The coil spring 56 is disposed between the bottom portion 76A of the recess 76 of the slider 74 and the switch 54 and urges the slider 74 to come into abutment on the fixture bar 46 (as indicated by the arrow G in FIG. 10).

Figure 11:
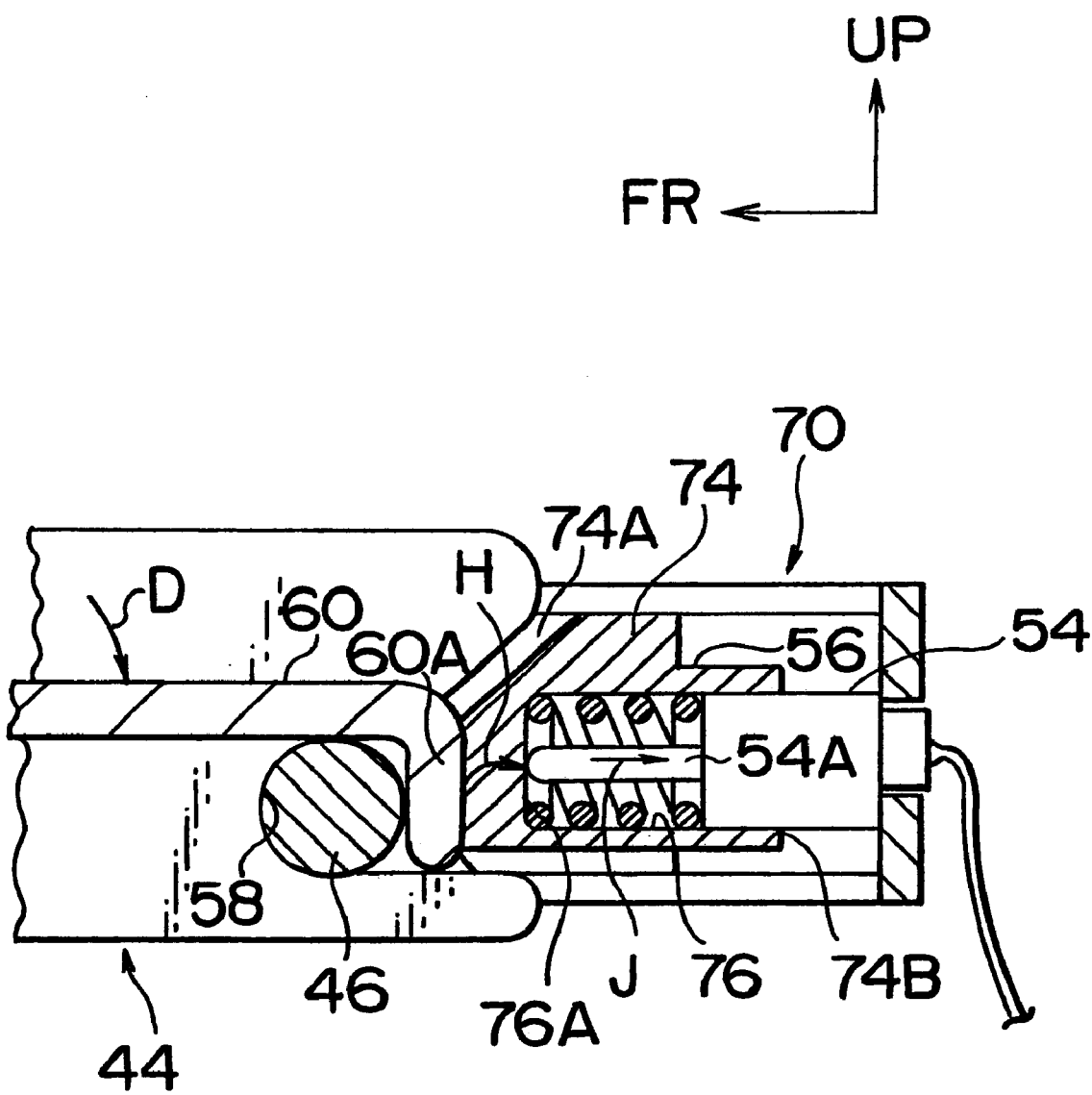
FIG. 11 is a cross-sectional view corresponding to FIG. 8, showing a state where the child seat of the vehicular child seat detection system according to the second embodiment of the present invention is mounted.

As shown in FIG. 11, the notch 58 of each of the left and right fixture attachments 44 attached to the child seat 42 is designed to accommodate the fixture bar 46 and a front portion of the slider 74. Hence, as shown in FIG. 11, if the lock bar 60 rotates downwards (as indicated by the arrow D in FIG. 11) in a state where the fixture bar 46 and the front portion of the slider 74 are accommodated in the notch 58 of the fixture attachment 44, the leading end portion 60A of the lock bar 60 becomes sandwiched between the fixture bar 46 and the slider 74. Thereby, the slider 74 moves rearwards (as indicated by the arrow H in FIG. 11).

If the slider 74 moves rearwards (as indicated by the arrow H in FIG. 11), the coil spring 56 disposed in the base body 72 of the child seat detector 70 is compressed, and the actuator 54A moves rearwards (as indicated by an arrow J in FIG. 11) so as to turn the switch 54 on. If the switch 54 is turned on, the air bag control circuit 32 determines that the child seat 42 has been laid on the seat cushion 40 of the front passenger seat 14, lights up the indicator 64, and deactivates the air bag device 20.

In the case where the indicator 64 has the display portion shown in FIG. 8B, this embodiment may be designed such that the signal from the switch 54 can be retrieved in two stages according to the stroke made by the slider 74, and that the upper display portion blinks on and off upon receiving an ON-signal from the switch 54 corresponding to a state where the slider 74 has just started to move. Furthermore, both the upper and lower portions may be lit up upon receiving an ON-signal from the switch 54 corresponding to a state where the lock bars of the fixture attachments 44 have become sandwiched between the striker 92 and the slider 74.

The operation of this embodiment will now be described.

According to this embodiment, in setting the child seat 42 onto the seat cushion 40 of the front passenger seat 14, the lock bar 60 is caused to rotate upwards (as indicated by the arrow C in FIG. 10) by operating the operational lever (not shown). Alternatively, the lock bar 60 rotates upwards automatically in response to the mounting of the child seat 42 to the seat 14. In either case, the lock bar 60 assumes a state shown in FIG. 10. The child seat 42 is then displaced rearwards with respect to the vehicle body and along the seat cushion 40, so that the fixture bar 46 and the front portion of the slider 74 come into the notch 58 of the fixture attachment 44 attached to the child seat 42.

In this state, the inclined plane 74A of the slider 74 abuts on the inclined plane 44A of the fixture attachment 44, and there is a slight gap formed between the fixture bar 46 and the slider 74. Hence, if the lock bar 60 then rotates downwards (as indicated by the arrow D in FIG. 11), the leading end portion 60A of the lock bar 60 becomes sandwiched between the fixture 46 and the slider 74 easily and reliably, owing to the aforementioned gap. As a result, the slider 74 moves rearwards (as indicated by the arrow H in FIG. 11).

As shown in FIG. 11, if the slider 74 moves rearwards, the coil spring 56 disposed in the base body 72 of the child seat detector 70 is compressed, and the actuator 54A moves rearwards (as indicated by the arrow J in FIG. 11) so as to turn the switch 54 on. If the switch 54 is turned on, the air bag control circuit 32 determines that the child seat 42 has been laid on the seat cushion 40 of the front passenger seat 14 and deactivates the air bag device 20. The indicator 64 warns the passenger, based on a signal from the air bag control circuit 32, that the child seat 42 has been mounted and that the air bag device 20 has been deactivated.

According to the vehicular child seat detection system of this embodiment, when the leading end portion 60A of the lock bar 60 becomes capable of securely locking the child seat 42, the switch 54 is turned on. In other words, when the leading end portion 60A of the lock bar 60 becomes sandwiched between the fixture bar 46 and the slider 74 to displace the slider 74 rearwards (as indicated by the arrow H in FIG. 11), the switch 54 is turned on. Therefore, it is possible to detect whether or not the child seat has been mounted to the vehicle securely.

A vehicular child seat detection system according to a third embodiment of the present invention will now be described with reference to FIG. 12.

In the first and third embodiments, like components are denoted by like reference numerals. Hereinafter, those components which operate in the same manner as in the first embodiment will not be described again.

Figure 12:
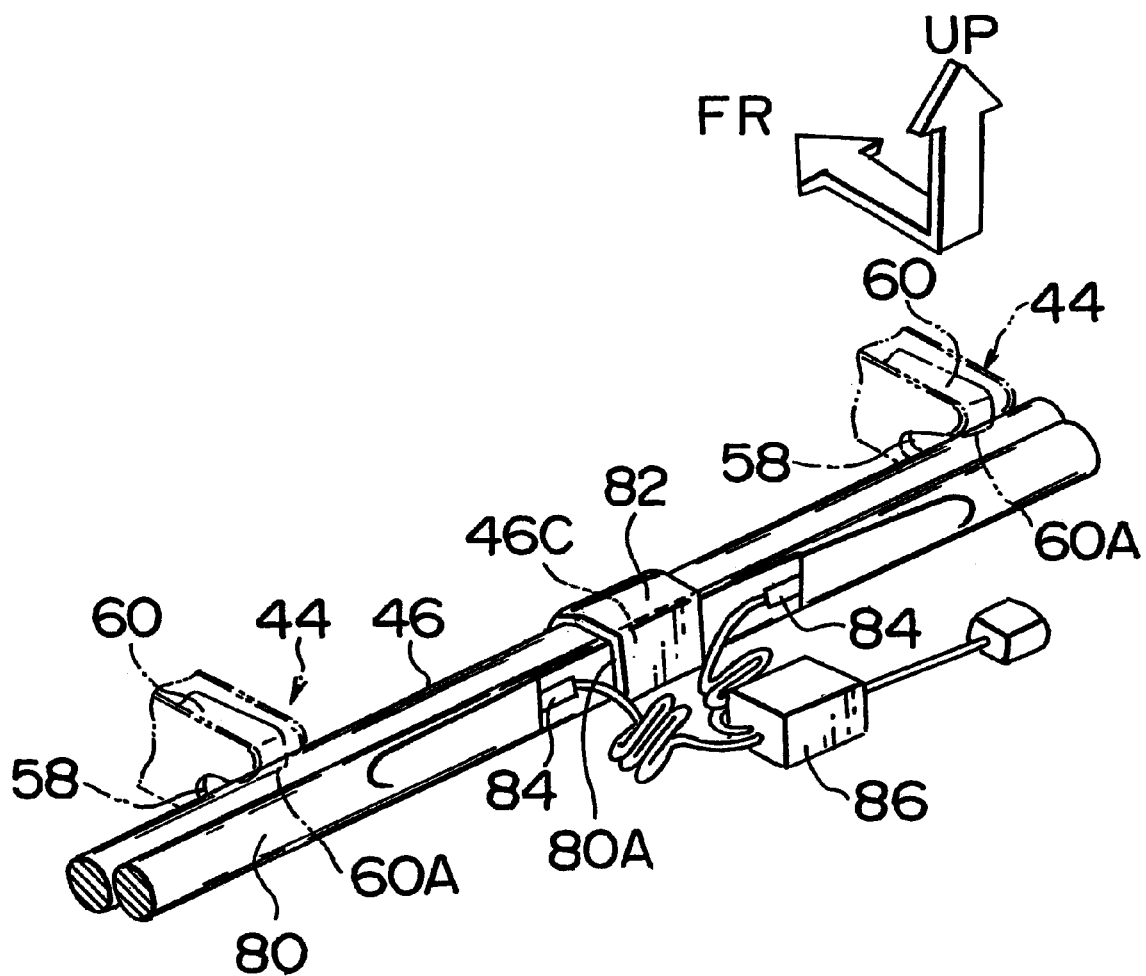
FIG. 12 is a perspective view showing mainly a fixture bar of a vehicular child seat detection system according to a third embodiment of the present invention, as viewed from a location diagonally rearward of the vehicle.

As shown in FIG. 12, in this embodiment, a rod 80 is disposed behind the fixture bar 46 extending parallel thereto. The fixture bar has a rear face 46C, which is flat and formed in the intermediate portion of the fixture bar 46. A sheet-like intermediate portion 80A of the rod 80 is fixed to the rear face 46C by means of a metal band 82, which serves as coupling means. A pair of left and right strain gages 84, which serve as strain measurement means, are attached to rear portions of the rod 80 that are contiguous to the band 82. The strain gages 84 are connected to the air bag control circuit 32 (See FIG. 1) via a signal converter 86.

Hence, if the leading end portion 60A of the lock bar 60 of the fixture attachment 44 becomes sandwiched between the fixture bar 46 and the rod 80, both sides of the intermediate portion 80A of the rod 80 get strained rearwards. The amount of strain imposed on the rod 80 at this time is detected by the strain gages 84, converted into a switch signal by the signal converter 86, and outputted to the air bag control circuit 32.

The operation of this embodiment will now be described.

According to this embodiment, in setting the child seat 42 onto the seat cushion 40 of the front passenger seat 14, the lock bar 60 is caused to rotate upwards by operating the operational lever (not shown). Alternatively, the lock bar 60 rotates upwards automatically in response to the mounting of the child seat 42 to the seat 14. The child seat 42 is then displaced rearwards with respect to the vehicle body and along the seat cushion 40, so that the fixture bar 46 and the front portion of the rod 80 come into the notch 58 of the fixture attachment 44 attached to the child seat 42.

After the fixture bar 46 and the front portion of the rod 80 have been received in the notch 58 of the fixture attachment 44 attached to the child seat 42, the lock bar 60 rotates downwards, so that the leading end portion 60A of the lock bar 60 becomes sandwiched between the fixture bar 46 and the rod 80. As a result, the intermediate portion 80A of the rod 80 is deflected rearwards.

If both sides of the intermediate portion 80A of the rod 80 become deflected and the rod 80 gets strained, the amount of strain imposed on the rod 80 is detected by the strain gages 84, converted into a switch signal by the signal converter 86, and outputted to the air bag control circuit 32. Based on the signal thus outputted, the air bag control circuit 32 determines that the child seat 42 has been laid on the seat cushion 40 of the front passenger seat 14 and deactivates the air bag device 20. Upon receiving the signal from the air bag control circuit 32, the indicator 64 warns the passenger that the child seat 42 has been mounted and that the air bag device 20 has been deactivated.

According to the vehicular child seat detection system of this embodiment, when the leading end portion 60A of the lock bar 60 becomes capable of securely locking the child seat 42, the switch 54 is turned on. In other words, when the leading end portion 60A of the lock bar 60 becomes sandwiched between the fixture bar 46 and the rod 80 to deflect both sides of the intermediate portion 80A thereof, the signal converter 86 outputs a switch signal. Therefore, it is possible to detect whether or not the child seat has been mounted to the vehicle securely.

Although this embodiment employs the band 82 as coupling means, it is to be noted that the coupling means should not be limited to the band 82. For example, a fastening member such as a bolt may also be used as the coupling means. The coupling means further includes welding, adhesives and the like.

A vehicular child seat detection system according to a fourth embodiment of the present invention will now be described with reference to FIG. 13.

In the second and fourth embodiments, like components are denoted by like reference numerals. Hereinafter, those components which operate in the same manner as in the second embodiment will not be described again.

Figure 13:
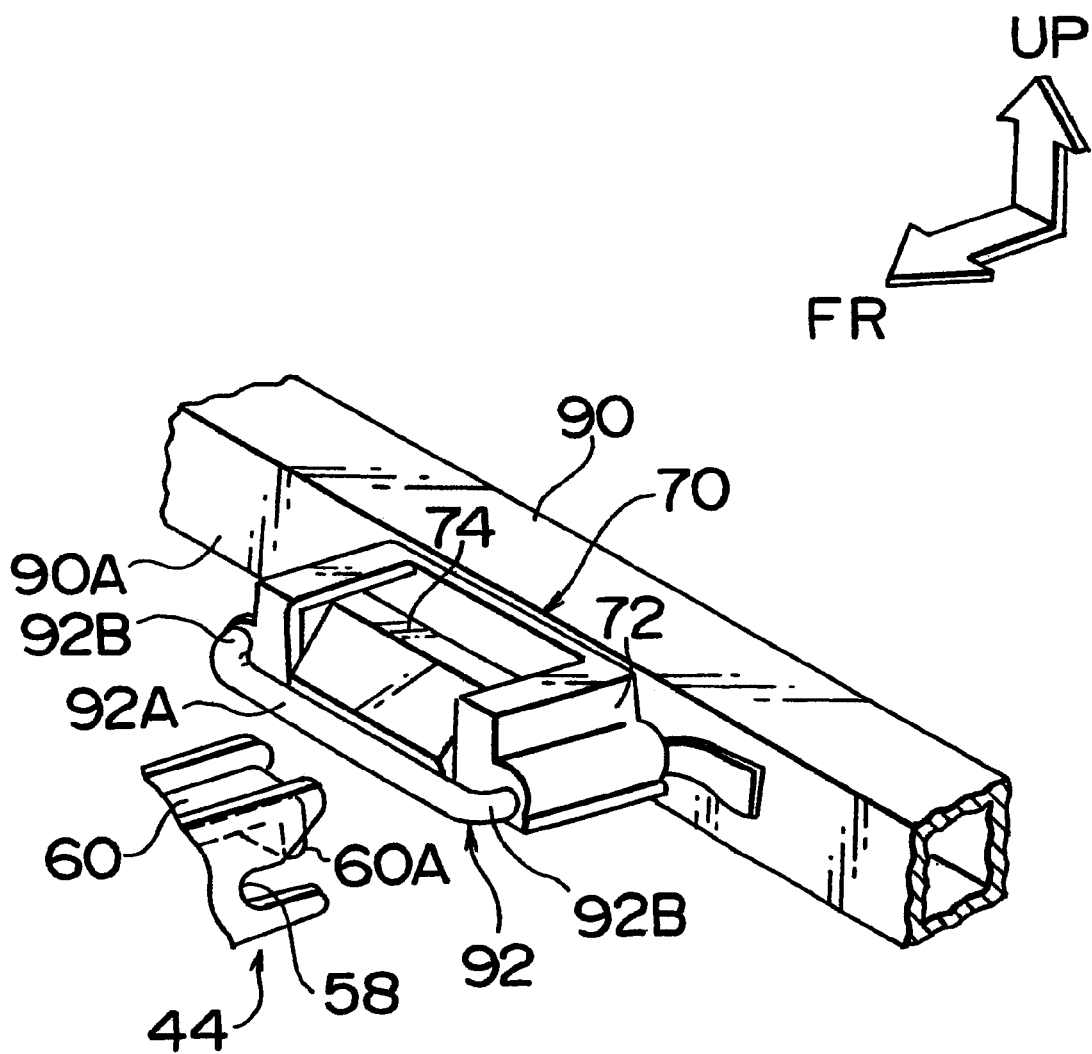
FIG. 13 is a perspective view showing mainly a striker of a vehicular child seat detection system according to a fourth embodiment of the present invention, as viewed from a location diagonally forward of the vehicle.
Figure 14:
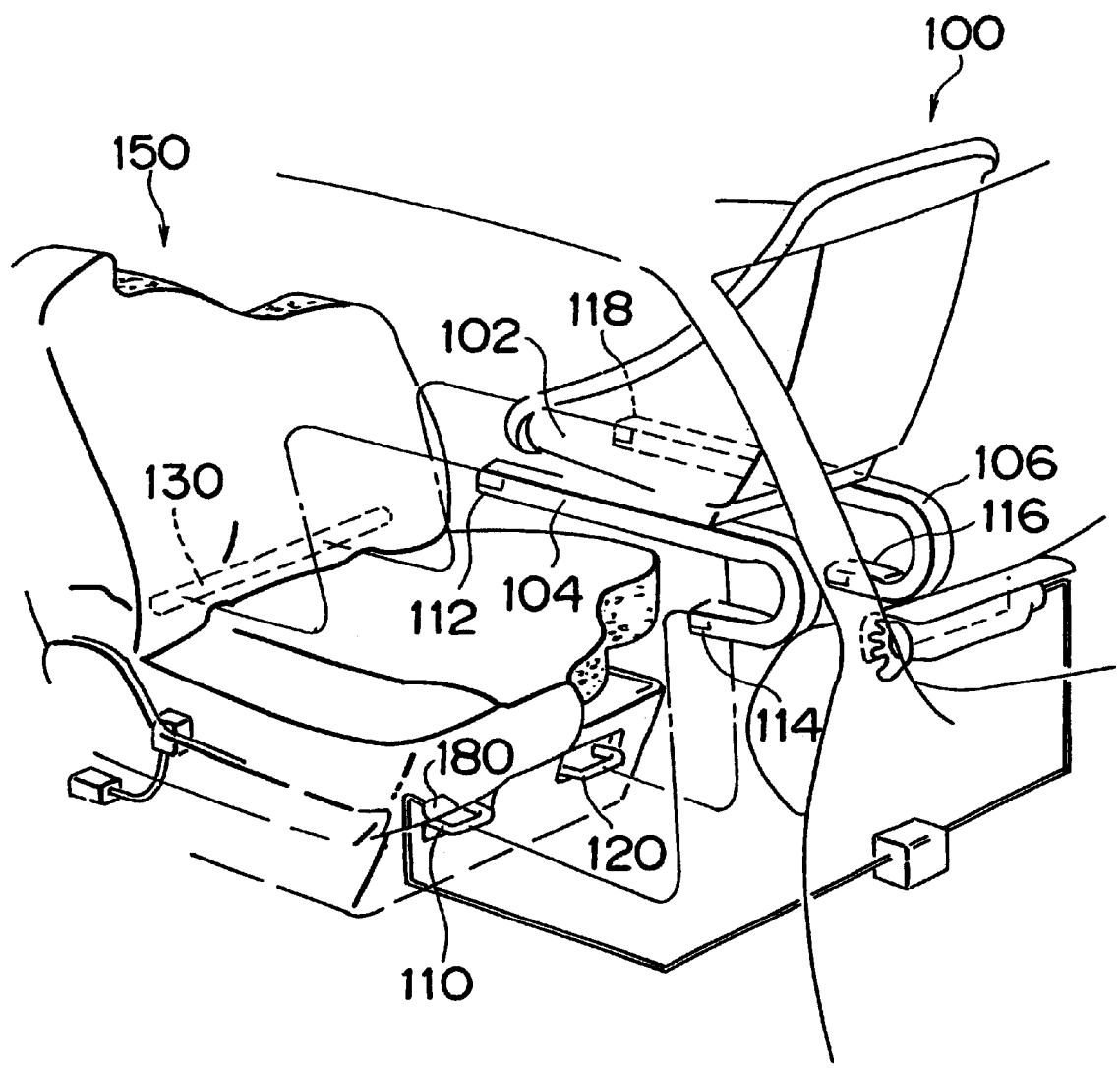
FIG. 14 is a schematic cross-sectional view of a vehicular child seat detection system.
Figure 15:
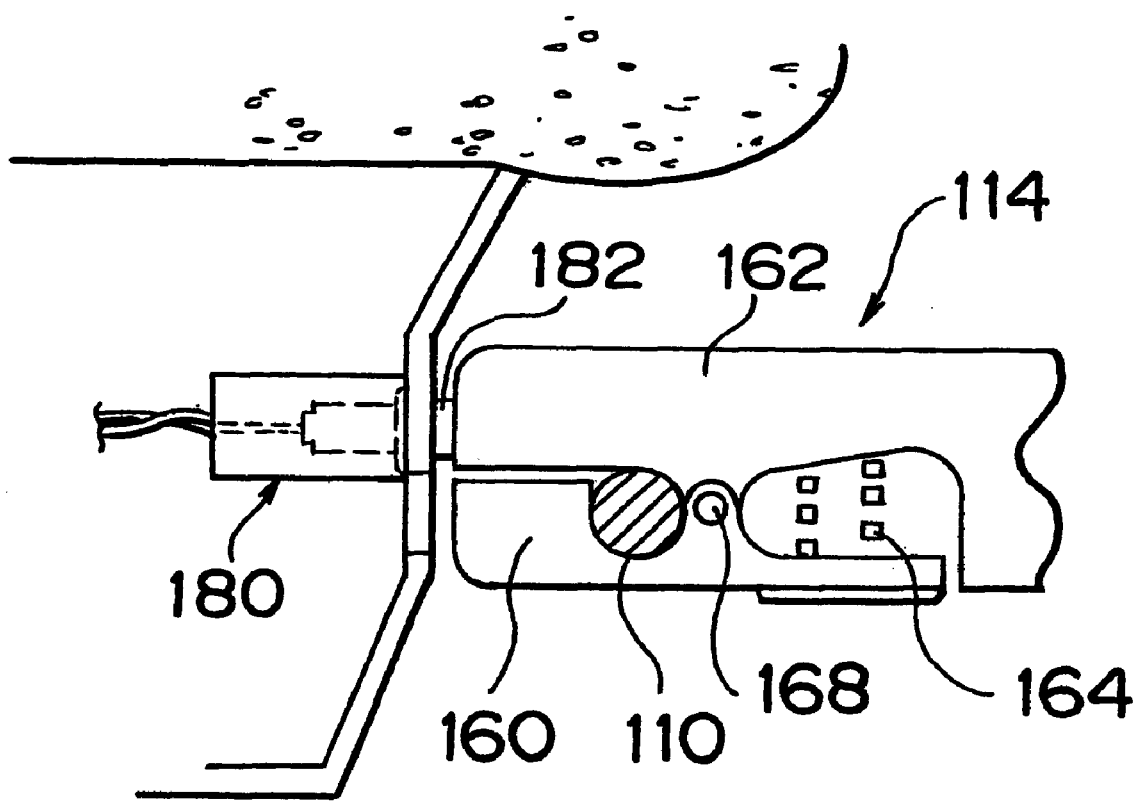
FIG. 15 is an enlarged cross-sectional view showing mainly a lock clamp of the vehicular child seat detection system shown in FIG. 14.

As shown in FIG. 13, in this embodiment, a member 90 of a rectangular cross-section hangs across the rear portions of the left and right seat cushion frames 36 (See FIG. 2). A pair of left and right strikers 92 are fixed to a front face 90A of the member 90 by means of welding or the like (FIG. 13 shows only one of the strikers 92). The striker 92 is bent into a shape of a hat, and the notch 58 of the fixture attachment 44 attached to the child seat 42 is designed to accommodate a central portion 92A, which is parallel to the front face 90A of the member 90. The child seat detector 70 is disposed between two lateral portions 92B of at least one of the left and right strikers 92. The child seat detector 70 is connected to the air bag control circuit 32 (See FIG. 1).

The child seat detector 70 is constructed in the same manner as in the second embodiment (See FIG. 10). If the lock bar 60 rotates downwards in a state where the central portion 92A of the striker 92 and the front portion of the slider 74 are accommodated in the notch 58 of the fixture attachment 44, the leading end portion 60A of the lock bar 60 becomes sandwiched between the striker 92 and the slider 74. Thereby, the slider 74 moves rearwards.

If the slider 74 moves rearwards, the coil spring 56 disposed in the base body 72 of the child seat detector 70 is compressed, and the actuator moves rearwards so as to turn the switch on. If the switch is turned on, as shown in FIG. 1, the air bag control circuit 32 determines that the child seat 42 has been laid on the seat cushion 40 of the front passenger seat 14, lights up the indicator 64, and deactivates the air bag device 20.

In the case where the indicator 64 has the display portion shown in FIG. 8B, this embodiment may be designed such that the signal from the switch 54 can be retrieved in two stages according to the stroke made by the slider 74, and that the upper display portion blinks on and off upon receiving an ON-signal from the switch 54 corresponding to a state where the slider 74 has just started to move. Furthermore, both the upper and lower portions may be lit up upon receiving an ON-signal from the switch 54 corresponding to a state where the lock bars of the fixture attachments 44 have become sandwiched between the striker 92 and the slider 74.

The operation of this embodiment will now be described.

According to this embodiment, in setting the child seat 42 onto the seat cushion 40 of the front passenger seat 14, the lock bar 60 is caused to rotate upwards by operating the operational lever (not shown). Alternatively, the lock bar 60 rotates upwards automatically in response to the mounting of the child seat 42 to the seat 14. The child seat 42 is then displaced rearwards with respect to the vehicle body and along the seat cushion 40, so that the central portion 92A of the striker 92 and the front portion of the slider 74 come into the notch 58 of the fixture attachment 44 attached to the child seat 42.

After the central portion 92A of the striker 92 and the front portion of the slider 74 have been received in the notch 58 of the fixture attachment 44 attached to the child seat 42, the lock bar 60 rotates downwards, so that the leading end portion 60A of the lock bar 60 becomes sandwiched between the striker 92 and the slider 74. As a result, the slider 74 moves rearwards.

If the slider 74 moves rearwards, the switch installed in the base body 72 of the child seat detector 70 is turned on. If the switch is turned on, the air bag control circuit 32 determines that the child seat 42 has been laid on the seat cushion 40 of the front passenger seat 14 and deactivates the air bag device 20. The indicator 64 warns the passenger, based on a signal from the air bag control circuit 32, that the child seat 42 has been mounted and that the air bag device 20 has been deactivated.

According to the vehicular child seat detection system of this embodiment, when the leading end portion 60A of the lock bar 60 becomes capable of securely locking the child seat 42, the switch is turned on. In other words, when the leading end portion 60A of the lock bar 60 becomes sandwiched between the striker 92 and the slider 74 to displace the slider 74 rearwards, the switch is turned on. Therefore, it is possible to detect whether or not the child seat has been mounted to the vehicle securely.

Furthermore, according to this embodiment, the fixture attachment 44 of the child seat 42 is fixed to the striker 92, which is relatively short in the direction of the width of the seat 14, and the child seat detector 70 is disposed inside the striker 92. Thus, the overall dimension of the system can be reduced.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

For example, according to the vehicular child seat detection system of the second embodiment of the present invention, as can be seen from FIG. 9, the child seat detector 70 is disposed at the location corresponding to one of the left and right fixture attachments 44, that is, in the vicinity of one end of the fixture bar 46. However, the child seat detector 70 may be disposed at each of two locations corresponding to both the left and right fixture attachments. Also, in the fourth embodiment of the present invention shown in FIG. 13, the child seat detector 70 can be disposed at each of two locations corresponding to both the left and right fixture attachments.

Moreover, in the first through fourth embodiments of the present invention, the indicator 64 is connected to the air bag control circuit 32 and lit up in accordance with a signal therefrom. However, the indicator 64 may be connected directly to the child seat detector and may be designed to be lit up in accordance with a signal therefrom. In addition to the signal from the child seat detector, signals from other switches such as a vehicular air bag manual cut-off switch may also be used so as to change contents to be indicated by the indicator 64.

What is claimed is:

1. A vehicular child seat detection system, comprising:
   a fixture bar to which fixture attachments extending from a child seat in a fore-to-aft direction thereof are detachably coupled, said fixture attachments being integrally attached to a vehicular seat and spaced apart from each other by a predetermined distance in a direction of a width of said child seat; and
   child seat detection means for detecting whether or not the child seat has been mounted, wherein
      said fixture attachments are provided with latches allowing said child seat to be fastened to or released from said vehicular seat, and
      said child seat detection means detects whether or not said child seat has been mounted, based on detection of the rotation of at least one latch of said latches to said fixture attachment so that said at least one latch is in a locked position.

2. The vehicular child seat detection system according to claim 1, wherein
   said fixture attachments are provided with groove portions in which said fixture bar is accommodated when said fixture attachments are coupled to said fixture bar, and
   in coupling said child seat to said vehicular seat, said latches reduce an opening width of said groove portions so as to prevent said fixture bar from falling off said groove portions.

3. The vehicular child seat detection system according to claim 1, wherein
   said child seat detection means is set opposed to at least one of the left and right fixture attachments for the child seat, and
   said child seat detection means is composed of:
      a base body attached to said fixture bar;
      moving means accommodated in said base body, pressed toward said fixture bar by urging means, and caused to move away from said fixture bar by at least one of said latches; and
      a switch activated due to a movement of said moving means.

4. The vehicular child seat detection system according to claim 3, wherein said moving means is composed of a slider movably accommodated in the base body attached to said fixture bar.

5. The vehicular child seat detection system according to claim 4, wherein said slider has an inclined plane for engagement with at least one of said latches.

6. The vehicular child seat detection system according to claim 1, wherein
   said fixture bar hangs across left and right seat frames of said vehicular seat.

7. The vehicular child seat detection system according to claim 6, wherein
   said child seat detection means is composed of:
      a rod parallel to said fixture bar and longer than the distance between said fixture attachments; and
      a switch disposed substantially at a central portion of said rod and activated when a distance between said fixture bar and said rod becomes equal to or greater than a predetermined value due to said latches, and
      in securely fastening said child seat to said vehicular seat, said latches cause said rod to move away from said fixture bar.

8. The vehicular child seat detection system according to claim 7, wherein
   said switch is interposed between said fixture attachments spaced apart from each other by the predetermined distance in the direction of the width of said child seat.

9. The vehicular child seat detection system according to claim 6, wherein
   said child seat detection means is composed of:
      a rod disposed parallel to said fixture bar and passing through engaging portions of said fixture attachments;
      coupling means for coupling said rod to said fixture bar; and
      strain measurement means attached to said rod.

10. The vehicular child seat detection system according to claim 1, wherein:
    said child seat detection means is set opposed to at least one of the left and right fixture attachments for the child seat; and
    said child seat detection means is composed of:
       a striker attached to said fixture bar;
       moving means pressed toward said striker by urging means and caused to move away from said striker by said latches; and
       a switch activated due to a movement of at least one of said moving means.

11. The vehicular child seat detection system according to claim 10, wherein said moving means is composed of a slider movably accommodated in the base body attached to said striker.

12. The vehicular child seat detection system according to claim 11, wherein said slider has an inclined plane for engagement with at least one of said latches.

13. The vehicular child seat detection system according to claim 1, further comprising:
    an indicator indicating, based on a result detected by said child seat detection means, whether or not the child seat has been mounted.

14. The vehicular child seat detection system according to claim 13, wherein
    said indicator is divided into a plurality of display portions,
    said child seat detection means detects a plurality of mounting states of said child seat, based on movements of at least one of said latches, and contents to be displayed on said display portions are changed in accordance with said plurality of mounting states.

15. The vehicular child seat detection system according to claim 1, further comprising:

air bag control means for controlling deployment of an air bag depending on whether or not the child seat has been mounted, based on a result detected by said child seat detection means.

16. A vehicular child seat detection system, comprising:

fixture attachments extending from a child seat in a fore-to-aft direction thereof, spaced apart from each other by a predetermined distance, and provided with latches allowing said child seat to be fastened to or released from a vehicular seat;

a fixture bar to which said fixture attachments are detachably coupled, said fixture bar being integrally attached to said vehicular seat; and child seat detection means for detecting whether or not said child seat has been mounted, based on detection of the rotation of at least one latch of said latches to said fixture attachment so that said at least one latch is in a locked position.

* * * * *